(12) United States Patent
Staempflin et al.

(10) Patent No.: US 12,071,255 B2
(45) Date of Patent: Aug. 27, 2024

(54) DRIVE DEVICE, FLYING VEHICLE AND METHOD FOR COOLING A MOTOR

(71) Applicant: L'Air Liquide, Societe Anonyme pour l'Etude et l'Exploitation des Procedes Georges Claude, Paris (FR)

(72) Inventors: Martin Staempflin, Sassenage (FR); Guillaume Delautre, Sassenage (FR); Loic Jeunesse, Sassenage (FR); Baptiste Zimmermann, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 17/766,168

(22) PCT Filed: Sep. 8, 2020

(86) PCT No.: PCT/EP2020/075042
§ 371 (c)(1),
(2) Date: Apr. 1, 2022

(87) PCT Pub. No.: WO2021/063638
PCT Pub. Date: Apr. 8, 2021

(65) Prior Publication Data
US 2024/0051675 A1    Feb. 15, 2024

(30) Foreign Application Priority Data

Oct. 1, 2019   (FR) ........................................ 1910861

(51) Int. Cl.
*B64D 33/08*        (2006.01)
*F25B 9/06*         (2006.01)
(Continued)

(52) U.S. Cl.
CPC ............... *B64D 33/08* (2013.01); *F25B 9/06* (2013.01); *F25B 25/00* (2013.01); *H02K 55/00* (2013.01);
(Continued)

(58) Field of Classification Search
CPC ... F25B 9/004; F25B 9/06; F25B 9/10; H05K 55/00; B64D 33/08
See application file for complete search history.

(56) References Cited

U.S. PATENT DOCUMENTS

| | | | |
|---|---|---|---|
| 5,473,899 A | 12/1995 | Viteri | |
| 11,731,780 B2 * | 8/2023 | Ranjan | B64D 41/00 454/71 |
| 2010/0139297 A1 * | 6/2010 | McCormick | F25B 9/06 62/89 |

FOREIGN PATENT DOCUMENTS

| | | | | |
|---|---|---|---|---|
| GB | 2548123 A | * | 9/2017 | ............. B64D 27/24 |
| JP | 2000 154 944 | | 6/2000 | |
| JP | 2019 095 079 | | 6/2019 | |

OTHER PUBLICATIONS

International Search Report and Written Report for PCT/EP2020/075042, mailed Nov. 23, 2020.
(Continued)

*Primary Examiner* — Christopher R Zerphey
(74) *Attorney, Agent, or Firm* — Justin K. Murray

(57) ABSTRACT

Disclosed is a drive device, in particular for a flying vehicle such as an aircraft or a spacecraft, comprising at least one engine and a device for cooling the engine, the device for cooling the engine comprising a cryogenic refrigerator, i.e. refrigerating to a temperature between −100° C. and −273° C., the refrigerator comprising a working circuit forming a loop and containing a working fluid, the working circuit forming a cycle comprising, in series: a mechanism for compressing the working fluid, a mechanism for cooling the working fluid, a mechanism for expanding the working fluid and a mechanism for heating the working fluid, the refrigerator comprising a portion for heat exchange between the working fluid expanded in the expansion mechanism and the engine, the refrigerator being configured to produce a first determined maximum refrigeration power, characterized in that the device for cooling the engine further comprises an additional refrigeration system comprising a cryogenic fluid store that can be brought into heat exchange with the refrigerator and/or the engine, the additional refrigeration system being configured to supply a second determined maximum refrigeration power to the refrigerator and/or to the engine when the cryogenic fluid is brought into heat exchange with the refrigerator and/or the engine.

14 Claims, 3 Drawing Sheets

(51) Int. Cl.
F25B 25/00 (2006.01)
H01F 6/04 (2006.01)
H02K 55/00 (2006.01)

(52) U.S. Cl.
CPC ..... *F25B 2400/04* (2013.01); *F25B 2400/072* (2013.01); *F25B 2400/14* (2013.01); *H01F 6/04* (2013.01); *Y02T 50/60* (2013.01)

(56) References Cited

OTHER PUBLICATIONS

Palmer, et al., "Modelling of cryogenic cooling system design concepts for superconducting aircraft propulsion," IET Electr. Syst. Transp., vol. 6, Issue 3, (2016), pp. 170-178.
Shawyer, et al., "Second generation EmDrive propulsion applied to SSTO launcher and intersteller probe," ACTA Astronautica, vol. 116, (2015), pp. 166-174.
Radebaugh, R., "Advances in Cryocoolers," Proceedings of the International Cryogenic Engineering Conference, May 20, 1996, pp. 33-44.

* cited by examiner

[Fig. 1]
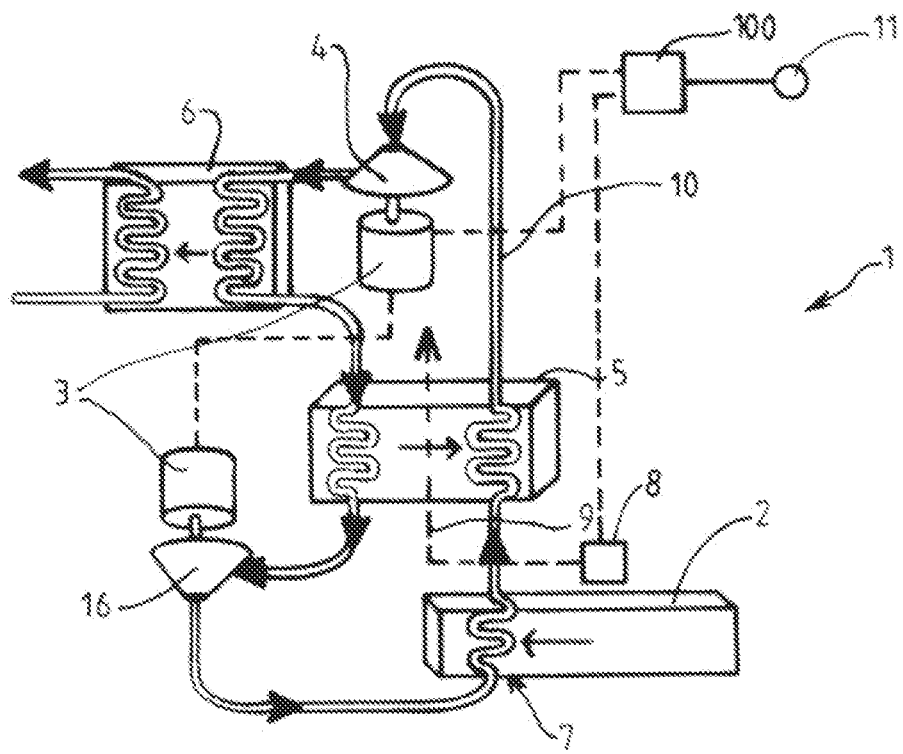
[Fig. 2]
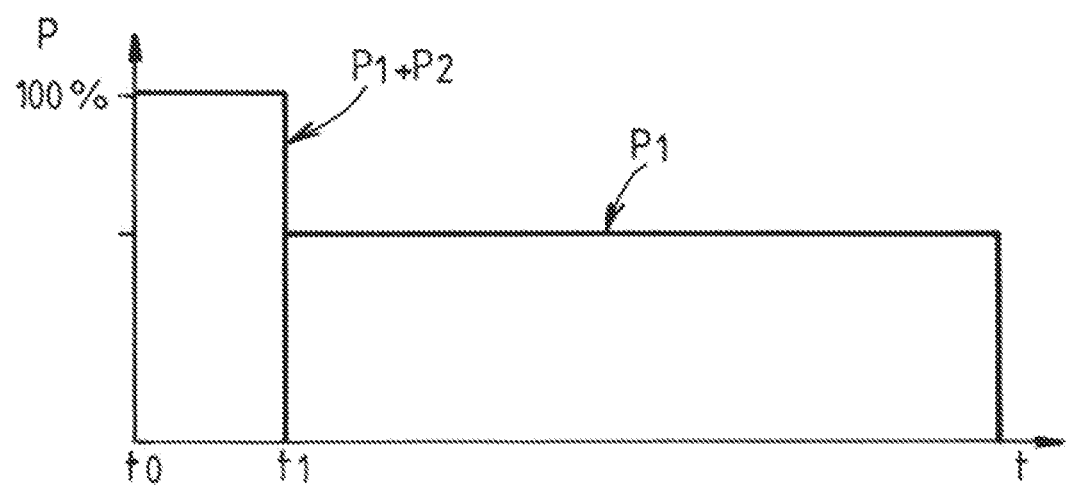

[Fig. 3]
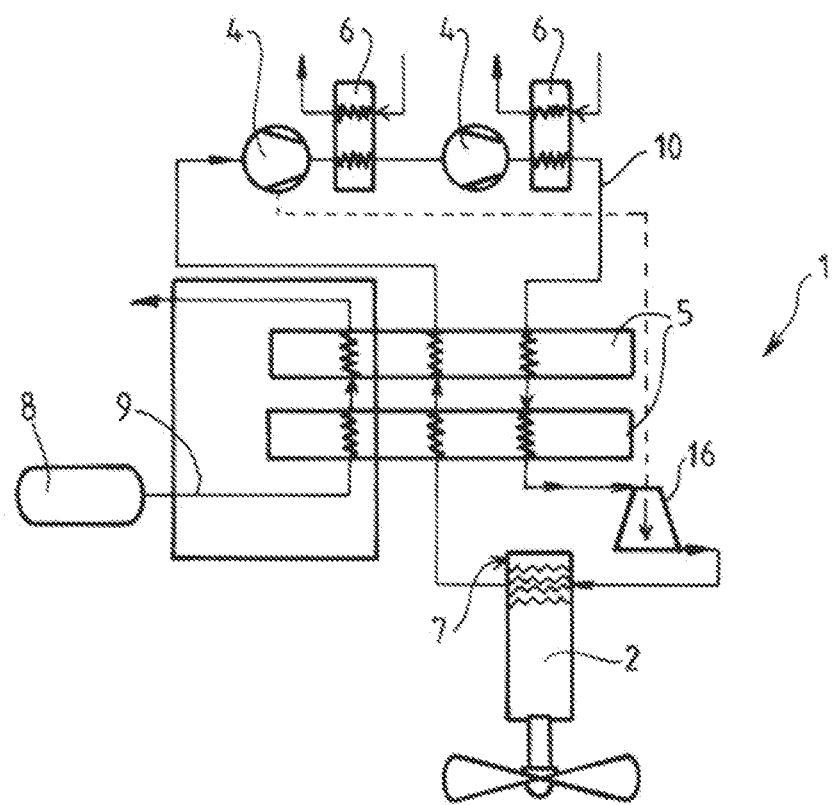

[Fig. 4]
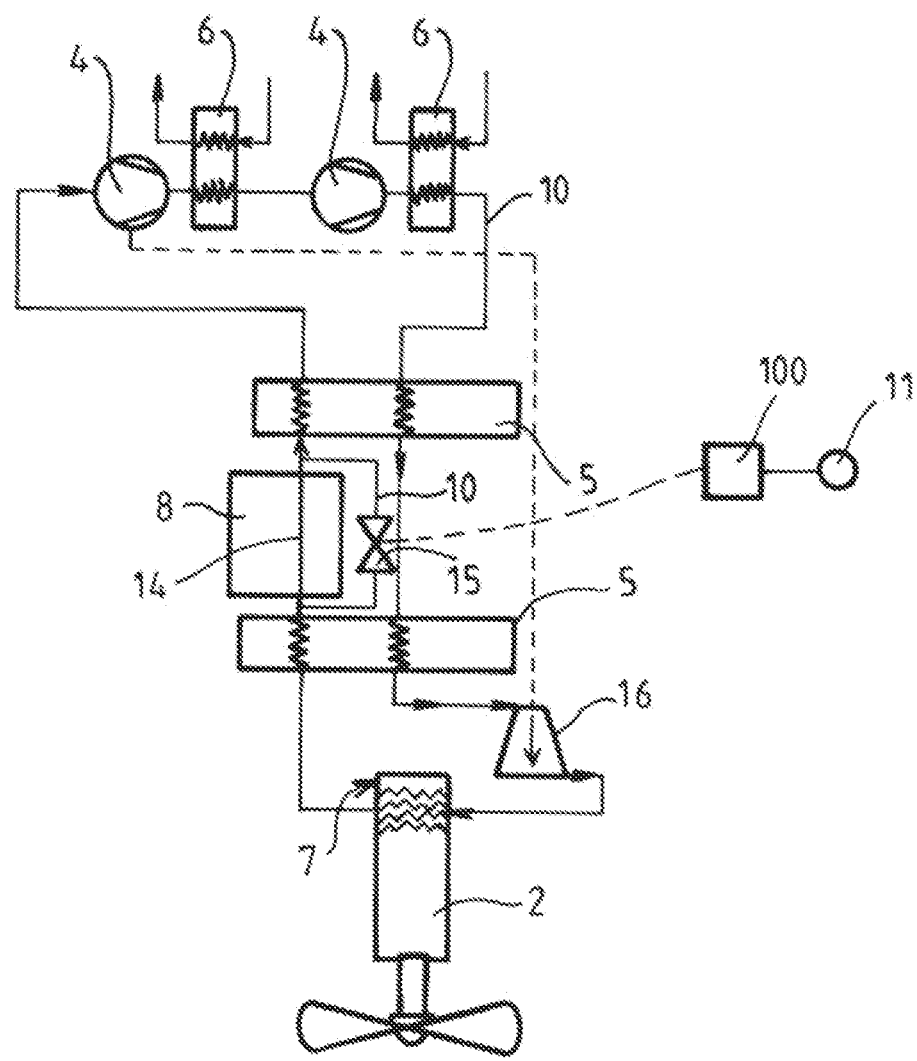

DRIVE DEVICE, FLYING VEHICLE AND METHOD FOR COOLING A MOTOR

CROSS-REFERENCE TO RELATED APPLICATIONS

This application is a § 371 of International PCT Application PCT/EP2020/075042, filed Sep. 8, 2020, which claims § 119(a) foreign priority to French patent application FR 1910861, filed Oct. 1, 2019.

BACKGROUND

Field of the Invention

The invention relates to a drive device, to a flying vehicle and to a method for cooling a motor.

The invention relates more particularly to a drive device, notably for flying vehicles such as an aircraft or spacecraft, and comprising at least one motor and a device for cooling the motor, the device for cooling the motor comprising a cryogenic refrigerator, which is to say one that operates at a temperature of between minus 100 degrees centigrade and minus 273 degrees centigrade, the refrigerator comprising a working circuit forming a loop and containing a working fluid, the working circuit forming a cycle comprising in series: a mechanism for compressing the working fluid, a mechanism for cooling the working fluid, a mechanism for expanding the working fluid and a mechanism for heating the working fluid, the refrigerator comprising a heat-exchange portion providing an exchange of heat between the working fluid expanded in the expansion mechanism and the motor, the refrigerator being configured to produce a determined first maximum refrigeration power.

Related Art

In order to cool motors, notably motors of the superconducting type, it is known practice to use a refrigerator of the cryogenic type, which is to say able to attain a cryogenic temperature comprised for example between −100 degrees centigrade and minus 273 degrees centigrade.

The integration of such a refrigerator into a vehicle, notably flying vehicle, is subject to constraints regarding mass.

In order to optimize the mass of such a refrigerator, the refrigerator may be of the type employing a working-fluid circuit operating on a thermodynamic cycle of the closed reverse Brayton type. Such a recuperative cycle may use centrifugal compressors to compress the working fluid, at least one counterflow heat exchanger, notably of the shell and tube type (for cooling after compression and heating after expansion), one or more centripetal expansion turbines, and alternators.

This architecture, although having a structure that is optimized by comparison with industrial refrigerators, is still far too heavy for certain aircraft or equivalent applications. Thus, in order to supply a cold power of the order of 1 kW at a temperature of 25 K (which is typically the amount of cold power needed for a superconducting motor with a power of around 1 MW), the mass of such a refrigerator may be as high as 250 kg. Although this is at least one order of magnitude lower than the mass of an industrial refrigerator, it nevertheless still represents several times the mass of the motor itself.

SUMMARY OF THE INVENTION

An objective of the present invention is to eliminate some or all of the disadvantages of the prior art indicated above.

To this end, the device according to the invention, in other respects in accordance with the generic definition thereof given in the above preamble, is essentially characterized in that the device for cooling the motor further comprises an additional refrigeration system comprising a store of cryogenic fluid that can be brought into a heat-exchange relationship with the refrigerator and/or with the motor, the additional refrigeration system being configured to supply a determined second maximum refrigeration power to the refrigerator and/or to the motor when the cryogenic fluid is brought into a heat-exchange relationship with the refrigerator and/or the motor.

This structure allows the cryogenic refrigerator to be rated for the usual, and possibly the longest, phase of use (cruising flight in the case of an aircraft for example) which may have a lower requirement for cooling compared with other brief phases of operation (takeoff for example).

This means that the mass of the on-board cryogenic refrigerator can be reduced for example by almost 50%, and that the supply of electrical power thereto can be reduced by almost 35% during the phases of operation concerned.

Furthermore, embodiments of the invention may include one or more of the following features:
- the store of cryogenic fluid of the additional refrigeration system comprises a fluid that is liquefied and/or in the solid state,
- the additional refrigeration system comprises a transfer circuit transferring the cryogenic fluid into a heat-exchange relationship with the refrigerator and/or with the so motor,
- the transfer circuit of the additional refrigeration system comprises a portion in a heat-exchange relationship with the circuit of the working fluid, notably with at least one heat exchanger for heating and/or cooling the working fluid of the working circuit,
- the working circuit comprises several heat exchangers for heating and/or cooling the working fluid and which are arranged in series, and the transfer circuit of the additional refrigeration system comprises a portion in a heat-exchange relationship with said in-series heat exchangers,
- the transfer circuit of the additional refrigeration system comprises an upstream end connected to the store of cryogenic fluid and a downstream end connected to a discharge zone,
- the additional refrigeration system comprises a bypass portion bypassing the working circuit and in a heat-exchange relationship with the cryogenic fluid of the store and a distribution system distributing at least a part of the working fluid of the working circuit into said bypass portion,
- the additional refrigeration system can be switched over between a first configuration supplying the second maximum refrigeration power to the refrigerator and/or to the motor and a second configuration supplying the refrigerator and/or the motor with a cooling power that is zero or is less than the second maximum refrigeration power,
- the additional refrigeration system is configured to increase only briefly the refrigeration power of the device for cooling the motor, which is to say that the first maximum refrigeration power is less than the sum of the first maximum refrigeration power and of the second maximum refrigeration power,
- the first maximum refrigeration power is comprised between 40 and 80% and preferably between 50 and 70% of the sum of the first maximum refrigeration power and of the second maximum refrigeration power, the store of cryogenic fluid of the additional refrigeration system contains at least one of the following: hydrogen, nitrogen, neon, helium in the liquid and/or solid state, the motor is of the superconducting type, the device comprises an electronic controller connected to the device for cooling the motor and configured to control the refrigeration power supplied to the motor by the refrigerator and by the additional refrigeration system, the electronic controller is configured to regulate the level of refrigeration power of the refrigerator and of the additional refrigeration system as a function of a setpoint signal.

The invention also relates to a flying vehicle comprising a drive device according to any one of the features mentioned above or hereafter.

According to other possible particular features:

the device for cooling the motor is configured to supply a first amount of cold to cool the motor during a first phase of operation of the vehicle, notably during a take-off/lift-off phase, and to supply a second amount of cold to cool the motor during a second phase of operation of the vehicle, notably during a phase of steady-state flight, the first amount of cold being greater than the second amount of cold, the first amount of cold is supplied by the refrigerator and possibly the additional refrigeration system, the second amount of cold is supplied by the refrigerator and possibly the additional refrigeration system, the first amount of cold is the sum of the first maximum refrigeration power supplied by the refrigerator and of the second maximum refrigeration power supplied by the additional refrigeration system, the second amount of cold consisting only of the first maximum refrigeration power supplied by the refrigerator.

The invention also relates to a method for cooling at least a motor of a vehicle according to any one of the features above or below, the method comprising a step of cooling the motor with a first amount of cold during a first phase of operation of the vehicle and a step of cooling the motor with a second amount of cold during a second phase of operation of the vehicle, the first amount of cold being greater than the second amount of cold, the first phase of operation of the vehicle being situated chronologically before or after the second phase of operation of the vehicle.

According to other possible particular features:

the first phase of operation of the vehicle has a determined first duration, for example during a take-off/lift-off phase comprised between one and ten minutes, the second phase of operation comprises, for example, a phase of steady-state flight having a second duration comprised between five minutes and several hours.

The invention may also relate to any alternative device or method comprising any combination of the features above or below within the scope of the claims.

BRIEF DESCRIPTION OF THE FIGURES

Further particular features and advantages will become apparent upon reading the following description, which is given with reference to the figures, in which:

FIG. 1 represents a schematic and partial view illustrating a first example of the structure and operation of the device of the invention, FIG. 2 represents an example of the variation of the refrigerating power supplied by the device over the course of time, FIG. 3 represents a schematic and partial view illustrating a second example of the structure and operation of the device of the invention, FIG. 4 represents a schematic and partial view illustrating a third example of the structure and operation of the device of the invention.

DETAILED DESCRIPTION OF THE INVENTION

The drive device 1, notably for a flying vehicle such as an aircraft or spacecraft and represented in FIG. 1 comprises a motor 2 and a device for cooling the motor 2. The device for cooling the motor 2 comprises a cryogenic refrigerator, which is to say one that cools a working fluid to a temperature of between minus 100 degrees centigrade and minus 273 degrees centigrade. The refrigerator comprises a working circuit 10 forming a loop (preferably a closed and fluidtight loop) and containing a working fluid. This working fluid may be helium, hydrogen or any other gas or mixture (for example helium and nitrogen or helium and argon or helium and neon or helium and nitrogen and argon or helium and nitrogen and neon, etc.).

The working circuit 10 forms a cycle comprising, in series: a mechanism 4 for compressing the working fluid, a mechanism 6 for cooling the compressed working fluid, a mechanism 16 for expanding the working fluid, and a mechanism 5, 7 for heating the expanded working fluid. Downstream of the expansion portion 16, the circuit preferably comprises a portion 7 providing exchange of heat between the cold working fluid expanded in the expansion mechanism 16 and the motor 2. This heat-exchange portion 7 may notably comprise a heat exchanger providing exchange of heat between the working fluid and the motor 2.

As illustrated, the refrigerator may comprise a cooling heat exchanger 6 cooling the working fluid leaving the compressor 4 (for example through an exchange of heat with water, air or another heat-transfer fluid). This makes it possible to achieve isothermal, or near-isothermal compression (or isentropic or near-isentropic compression).

As schematically indicated in dotted line, the turbine 16 and the compressor 4 may be mounted (directly coupled) at the respective two ends of the driveshaft of a high-speed (10 000 revolutions per minute or several tens or several hundreds of thousands of revolutions per minute) drive motor 3.

Alternatively, the turbines and compressors can be uncoupled so as to be able to rotate at different rotational speeds (notably between two hundred thousand and three hundred thousand revolutions per minute in the case of the turbines, and one hundred and fifty thousand revolutions per minute in the case of the compressors). In the latter case, the turbine 16 may be connected to an alternator able to recuperate the energy of expansion, which energy, when converted into electricity, may serve to power the motor of the compressor 4. As a preference, the compressor(s) 4 and turbine(s) 16 are mounted on the shaft via static, magnetic or dynamic gas bearings.

This refrigerator is configured to produce a determined first maximum refrigeration power P1.

The device for cooling the motor 2 further comprises an additional refrigeration system. This additional refrigeration system is distinct from the mechanism 6 for cooling the so working gas and also distinct from the working fluid and from the corresponding working circuit 10. This additional refrigeration system comprising, in the example of FIG. 3, a store or reservoir 8 of cryogenic fluid and a transfer circuit 9 allowing, if need be, an exchange of heat between the cryogenic fluid and the refrigerator and/or the motor 2. This additional refrigeration system is configured to supply a determined second maximum refrigeration power P2 to the refrigerator and/or to the motor 2 if need be, which is to say that the store 8 and the transfer circuit 9 are distinct from the working circuit and from the mechanism for cooling the working fluid (after it has been compressed). This transfer circuit 9 is configured to be able to supply an additional refrigeration power only if need be (for example intermittently).

As a preference, the additional refrigeration system can be switched over between at least a first configuration supplying the determined second maximum refrigeration power P2 to the refrigerator and a second configuration supplying the refrigerator with a cooling power that is zero or is less than the determined second maximum refrigeration power P2.

Thus, the additional refrigeration system is configured to allow the refrigeration power of the device for cooling the motor 2 to be increased briefly. What that is to say is that the determined first maximum refrigeration power P1 is less than the sum of the determined first maximum refrigeration power P1 and of the second maximum refrigeration power P2.

This is schematically indicated by way of example in FIG. 2. For example, the cryogenic refrigerator is rated to supply the maximum cold power corresponding to the most frequent mode of operation, for example the longest phase in the flight of the craft (cruising flight). The first refrigeration power P1 is that required to cool the motor 2 during the cruising phase of the flight (from t1 onwards). It may correspond to 50 to 70% of the cold power needed at take-off/lift-off (100% between t0 and t1). Thus, during the phase that consumes the highest amount of cooling power (for example take-off/lift-off, of which the duration t1-t0 is generally less than 5 min), the cooling device will then, at that moment, additionally employ the additional refrigeration system. For example, liquid hydrogen (stored at a temperature of around 25 K) or another fluid (nitrogen, helium, neon, etc.) may be injected into the cycle of the working circuit 10. This cryogenic liquid heats up as it ascends through the heat exchanger 5, cooling the working fluid in the cycle. For example, the additional refrigeration system is brought into a heat-exchange relationship, via the transfer circuit 9, with at least one main (for example counterflow) heat exchanger 5 of the working circuit 10.

The heated and possibly vaporized fluid may be discharged to the outside in a recuperation zone, for example, to a fuel cell which recovers the hydrogen to generate electricity when it is this fluid that is used.

In the case of an aircraft, the cold power needed during the course of a flight may vary greatly. As illustrated, it may be at a maximum at take-off (a phase with a duration of a few minutes) and may then drop by around 30 to 50% for the rest of the flight (which may have a duration of several hours). The device can meet these requirements while at the same time being optimized in terms of mass.

In the case of a refrigeration power of 1 kW at 25 K which is needed during take-off/lift-off (P1+P2=100%), for example for five minutes, with a lower refrigeration power required thereafter: 665 W at 25 K for the rest of the flight (P1=70%), the amount (mass) of liquid hydrogen (or other cryogenic liquid) required is relatively low, notably under 200 g. The associated flow rate may be less than 1 g/s.

Thus, unlike a conventional refrigerator alone, which has an electrical power of around 46 kW and an optimized mass (excluding frame, power cables and control and power supply cabinets) of the order of 250 kg, the cryogenic refrigerator of the device according to the invention could have a mass reduced down to around 130 kg for a maximum electrical power of around 30 kW. Thus, by injecting a very small amount of liquid hydrogen (or other very cold fluid) into the cycle of the working circuit for a duration of around five minutes, it is therefore possible to reduce the mass of the on-board cryogenic refrigerator by almost 50%.

As illustrated, the transfer circuit 9 of the additional refrigeration system preferably comprises a portion in a heat-exchange relationship with the circuit 10 of the working fluid, notably with at least one heat exchanger 5 for heating and/or cooling the working fluid.

Of course, the invention is not limited to the schematic example of [FIG. 1]. As illustrated by way of example in [FIG. 3], the working circuit 10 may comprise several heat exchangers 5 for heating and cooling the working fluid (counterflow heat exchangers) arranged in series. The transfer circuit 9 of the additional refrigeration system may comprise a portion in a heat-exchange relationship with all or some of said in-series heat exchangers 5.

The transfer circuit 9 of the additional refrigeration system may comprise an upstream end connected to the store 8 of cryogenic fluid and a downstream end connected to a discharge zone. As mentioned above, this discharge zone may for example comprise a fuel cell inlet (for recycling the gas through this fuel cell when this gas is hydrogen for example), or a combustion chamber when the fluid is a combustible fuel (notably in the case of hydrogen).

As schematically indicated in FIG. 1, the device or vehicle may comprise an electronic controller 100 connected to the device for cooling the motor 2 and configured to control the refrigeration power supplied to the motor 2 by the additional refrigeration system and possibly by the refrigerator. For example, the electronic controller 100 comprises a microprocessor and/or a controller and/or a computer and is configured (programmed) to operate all or some of the components of the device, notably a control valve 12 that controls the flow rate in the transfer circuit 9.

The electronic controller 100 may notably be configured to regulate the level of refrigeration power of the refrigerator and notably of the additional refrigeration system as a function of a setpoint signal 11, for example transmitted by the motor 2 or some other part of the vehicle or of the device (setpoint signal dependent on the phase of use or refrigeration requirement of the motor 2).

Likewise, as illustrated, the cryogenic refrigerator may comprise several compressors 4 in series (two in the example of FIG. 3 although it is conceivable for there to be one, two, three or more than four) and one or more turbines 16 (it is conceivable for there to be two, three or more than four in series and/or in parallel).

Likewise as illustrated, an exchanger 6 for cooling the working fluid may be provided at the outlet of each compressor 4 or at the outlet of just some of them. As a preference, the working circuit subjects the working fluid to a thermodynamic cycle of the reverse Brayton type.

The embodiment of FIG. 4 differs from that of FIG. 3 only in that the additional refrigeration system comprises a store 8 of cryogenic fluid (preferably containing gas in the solid state: neon or any other appropriate gas or mixture of gases) and a bypass portion 14 bypassing the working circuit 10 and in a heat-exchange relationship with the cryogenic fluid of the store 8 and associated with a distribution system 15 distributing at least a part of the working fluid of the working circuit 10 into said bypass portion 14.

For example, the bypass portion 14 passes through the store 8 of cryogenic fluid. The distribution system 15 may comprise at least one valve which, depending on its state (closed/open) causes the working fluid of the working circuit 10 to pass, or not pass, through the store 8 in order to cool this fluid by exchange of heat with the cryogenic fluid of the store 8. For example, the distribution system 15 may be of the all-or-nothing type or of the progressive type, which is to say of the type that allows just a fraction of the working fluid to be distributed via the store 8 of cryogenic fluid in order to regulate the amount of cold supplied to the refrigerator. The distribution system may be operated by the electronic controller 100.

As illustrated, the store 8 of cryogenic fluid may be interposed between two heat exchangers 5 of the refrigerator, in order, when necessary, to provide additional cooling of the working fluid in its cycle. The invention may apply to the cooling of any part or apparatus other than a motor of a vehicle. In particular, the embodiment employing a store of cryogenic fluid containing gas in the solid state may be used to supplement the refrigeration power of a cryogenic refrigerator. The cryogenic refrigerator may thereby be optimized (notably in terms of mass). This makes it possible, when mass is a constraint on a cryogenic refrigerator (cryocooler), and when greater or lesser cooling powers are needed depending on the phase of operation, for the refrigerator to be rated for the lowest cold power and to have an additional cold source for the phases that require a greater cooling power.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A drive device for a flying vehicle, comprising:
   at least one motor;
   a compressor for compressing a working fluid, thereby providing a compressed working fluid;
   a first heat exchanger for cooling the compressed working fluid, thereby providing a cooled compressed working fluid;
   at least one second heat exchanger;
   an expansion turbine;
   a third heat exchanger; and
   a store of a cryogenic fluid that is liquefied and/or in the solid state;
   a cryogenic refrigerator with an operating temperature between −100° C. and −273° C. comprising a working circuit that forms a loop and contains the working fluid, the working circuit comprising, in series, said compressor, said expansion turbine, said first heat exchanger, said at least one second heat exchanger, and said third heat exchanger, the working circuit configured to subject the working fluid to a cycle including, in order, compression at said compressor, cooling at said first heat exchanger, cooling at said at least one second heat exchanger, expansion at said expansion turbine, warming at said third heat exchanger through heat exchange with said motor, warming at said second heat exchanger before returning to said compressor, the cryogenic refrigerator being configured to produce a determined first maximum refrigeration power to said motor;
   a supplemental refrigerator comprising said store and which is distinct from said first and third heat exchangers and said working fluid;
   wherein the supplemental refrigerator further comprises a transfer circuit that is configured to transfer the cryogenic fluid into a heat-exchange relationship with the working fluid of the cryogenic refrigerator,
   wherein the supplemental refrigerator is further configured to supply a determined second maximum refrigeration power to said cryogenic refrigerator when the cryogenic fluid is brought into a heat-exchange relationship with said cryogenic refrigerator; and
   wherein the supplemental refrigerator is switchable between a first configuration in which said second maximum refrigeration power is supplied to said cryogenic refrigerator by bringing the cryogenic fluid into heat exchange relationship with said cryogenic refrigerator and a second configuration in which the supplemental refrigerator stops bringing the cryogenic fluid into heat exchange relationship with said cryogenic refrigerator such that no refrigeration power is delivered from the supplemental refrigerator to the cryogenic refrigerator,
   wherein said store contains at least one of: hydrogen, nitrogen, neon, and helium,
   wherein the drive device further comprises an electronic controller that is configured to control the refrigeration power that is supplied to said motor by said cryogenic refrigerator and by said supplemental refrigerator, wherein the controller comprises a microprocessor and memory coupled to the microprocessor, the memory storing instructions that, when executed by the microprocessor, cause the microprocessor to perform operations comprising: analyzing a setpoint signal, and switching between the first configuration and the second configuration based on the setpoint signal, wherein the setpoint signal is based on a refrigeration requirement of the motor.

2. The device of claim 1, wherein said transfer circuit is in heat exchange relationship with the working fluid in said cryogenic refrigerator via said at least one second heat exchanger.

3. The device of claim 1, wherein said at least one second heat exchanger comprises several second heat exchangers in series and portions of said transfer circuit are in heat-exchange relationship with each of said several second heat exchangers.

4. The device of claim 1, wherein said transfer circuit comprises an upstream end connected to said store and a downstream end connected to a discharge zone, wherein the discharge zone comprises a fuel cell inlet or a combustion chamber.

5. The device of claim 1, wherein said supplemental refrigerator further comprises a bypass portion that bypasses said at least one second heat exchanger and a distribution system that distributes at least a part of the working fluid of said working circuit into said bypass portion.

6. The device of claim 1, wherein said first maximum refrigeration power is between 40-80% of a sum of said first maximum refrigeration power and said second maximum refrigeration power.

7. The device of claim 1, wherein said motor is a superconducting motor.

8. The device of claim 1, wherein said electronic controller is configured to regulate a level of refrigeration power of said cryogenic refrigerator and said supplemental refrigerator as a function of a setpoint signal.

9. A flying vehicle comprising the drive device of claim 1.

10. The vehicle of claim 9, wherein the cryogenic refrigerator is configured to supply a first amount of cold to cool said motor during a first phase of operation of the vehicle, during takeoff/lift-off, and to supply a second amount of cold to cool said motor during a second phase of operation of the vehicle, during a phase of steady-state flight, said first amount of cold being greater than said second amount of cold (P1).

11. The vehicle of claim 10, wherein said first amount of cold is supplied by said cryogenic refrigerator, and said supplemental refrigerator, said second amount of cold being supplied solely by said cryogenic refrigerator.

12. The vehicle of claim 10, wherein said first amount of cold is a sum of said first maximum refrigeration power supplied by said cryogenic refrigerator and of said second maximum refrigeration power supplied by said supplemental refrigerator, said second amount of cold consisting only of said first maximum refrigeration power supplied by the refrigerator.

13. A method for cooling at least a motor of a vehicle, comprising the steps of:
   a. providing the vehicle of claim 10;
   b. cooling said motor with said first amount of cold during a first phase of operation of the vehicle; and
   c. cooling said motor with said second amount of cold (P1) during a second phase of operation of the vehicle, wherein said first amount of cold is greater than said second amount of cold and said first phase of operation of the vehicle occurs before or after said second phase of operation of the vehicle.

14. The method of claim 13, wherein said first phase of operation of said vehicle has a determined first duration, during a take-off/lift-off phase, lasting between 1-10 minutes, and wherein said second phase of operation has a second duration, during a phase of steady-state flight, lasting between 5 minutes and several hours.

* * * * *